United States Patent [19]
Amberg et al.

[11] Patent Number: 5,963,743
[45] Date of Patent: Oct. 5, 1999

[54] DATABASE FOR FACILITATING SOFTWARE INSTALLATION AND TESTING FOR A BUILD-TO-ORDER COMPUTER SYSTEM

[75] Inventors: Richard D. Amberg; Roger W. Wong, both of Austin; Michael A. Brundridge, Georgetown, all of Tex.

[73] Assignee: Dell USA, L.P., Round Rock, Tex.

[21] Appl. No.: 08/921,438

[22] Filed: Aug. 29, 1997

[51] Int. Cl.⁶ .................................................. G06F 9/45
[52] U.S. Cl. ............................................. 395/712; 707/104
[58] Field of Search .................................. 395/712, 651, 395/652, 653; 707/104

[56] References Cited

U.S. PATENT DOCUMENTS

| | | | |
|---|---|---|---|
| 4,590,557 | 5/1986 | Lillie | 395/651 |
| 5,291,585 | 3/1994 | Sato et al. | 395/500 |
| 5,414,846 | 5/1995 | Lemble et al. | 395/651 |
| 5,432,941 | 7/1995 | Crick et al. | 395/651 |
| 5,499,357 | 3/1996 | Sonty et al. | 395/500 |
| 5,555,416 | 9/1996 | Owens et al. | 395/712 |
| 5,586,324 | 12/1996 | Sato et al. | 395/652 |
| 5,668,992 | 9/1997 | Hammer et al. | 395/651 |
| 5,745,568 | 4/1998 | O'Connor et al. | 380/4 |
| 5,794,052 | 8/1998 | Harding | 395/712 |

FOREIGN PATENT DOCUMENTS

| | | |
|---|---|---|
| 2 291 517 | 7/1995 | United Kingdom . |
| 2 309 104 | 1/1996 | United Kingdom . |

*Primary Examiner*—Tariq R. Hefiz
*Assistant Examiner*—Wei Zhen
*Attorney, Agent, or Firm*—Haynes & Boone, L.L.P.

[57] ABSTRACT

An apparatus for installing software onto a computer system includes a step table and a component table. The step table contains a set of software installation steps shared among different components of substantially all computer systems being manufactured. The component table contains a set of substantially all possible components that are included within computer systems being manufactured. The computer system corresponds to a family of computer systems and the apparatus further includes a family relation table, a family relation table and a family component relation table. The family relation table identifies the relationship between a set of software installation steps and each family of computer system being manufactured. The family component relation table identifies the relationship between the family of computer systems and the set of components. The family step relation table identifies the relation between a component and a set of software installation steps appropriate for the corresponding component.

55 Claims, 7 Drawing Sheets

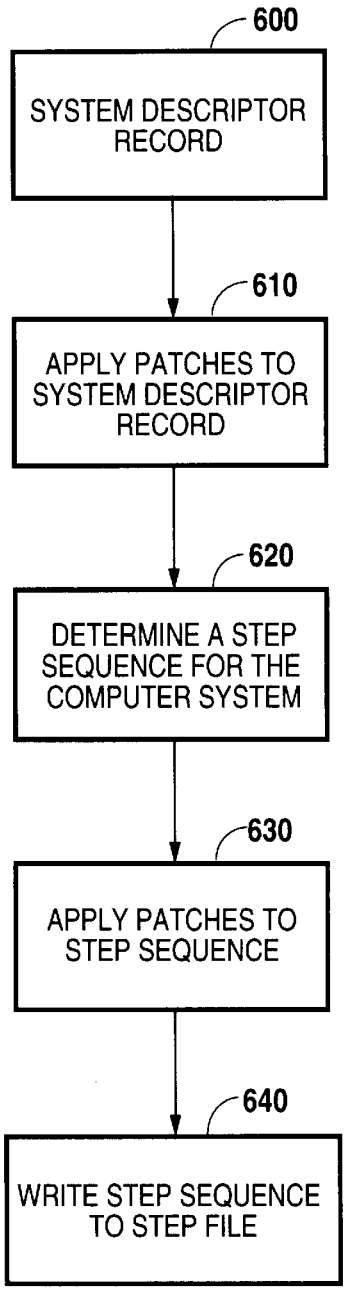
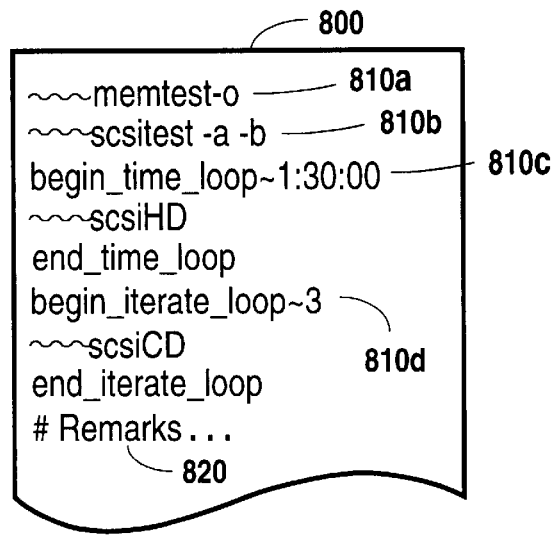
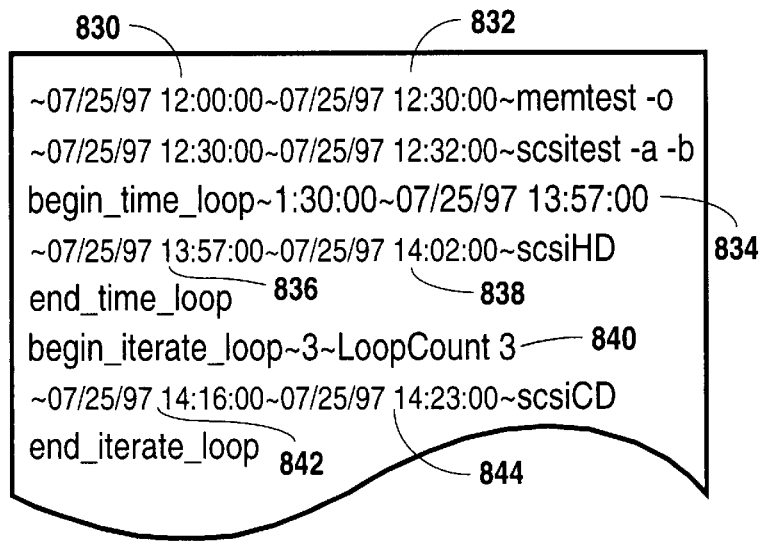
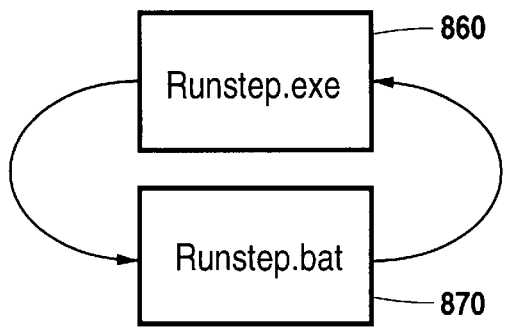
Fig. 7
Fig. 8
Fig. 9
Fig. 10

DATABASE FOR FACILITATING SOFTWARE INSTALLATION AND TESTING FOR A BUILD-TO-ORDER COMPUTER SYSTEM

CROSS-REFERENCE TO RELATED APPLICATIONS

This application relates to co-pending U.S. patent application Ser. No. 08/920,773, filed on now entitled Software Installation And Testing For A Build-To-Order Computer System and naming Richard D. Amberg, Roger W. Wong, and Michael A. Brundridge as inventors, the application being incorporated herein by reference in its entirety.

This application relates to co-pending U.S. patent application Ser. No. 08/919,959 attorney docket number M-5217 US, filed on even date herewith, entitled Software Installation And Testing For A Build-To-Order Computer System and naming Richard D. Amberg, Roger W. Wong, and Michael A. Brundridge as inventors, the application being incorporated herein by reference in its entirety.

BACKGROUND OF THE INVENTION

1. Field of the Invention

The present embodiment relates to computer system diagnostics and more particularly to a method for sequencing software installation and/or testing steps for a computer system.

2. Description of the Related Art

Personal computer systems in general and IBM compatible personal computer systems in particular have attained widespread use for providing computing power to many segments of society. A personal computer system can usually be defined as a desk-top, floor-standing, or portable microcomputer that includes a system unit having a system processor and associated volatile and non-volatile memory, a display monitor, a keyboard, one or more diskette drives, a fixed disk storage device and an optional printer.

It has been known to install software and to perform tests on computer systems before they are shipped to businesses or individual customers. The goal of software installation and testing is to efficiently produce a useful, reliable computer system which may be delivered to businesses and individuals free from errors and ready to run. In general, testing detects and analyzes errors that occur in both the hardware and software portions of the computer system. A partial list of computer system hardware tests might include diagnostics upon hardware components such as a processor, memory, a disk storage device, an audio device, a graphics device, a keyboard, a mouse, and a printer. Software installation often includes loading a desired package of software onto the computer system, preparing appropriate environment variables for the computer, and preparing appropriate initialization files for the loaded software. Software testing often includes making sure that a desired version of software has been installed onto the computer system and that appropriate drivers are present on the computer system.

It has been known in the industry to install software and to test computer systems during manufacture by performing a fixed procedure before they are shipped to customers. For instance, a diskette containing certain diagnostic tests for a certain type of computer system is created. The diskette includes lengthy, often-complicated batch files which direct the software installation and diagnostic processes. The diskette further contains all the executable files for performing tests on the computer system being purchased.

Each computer system being built is provided with a respective copy of this diskette. These diskettes accompany the computer systems being built around a factory floor during the manufacturing process, tests being run on the respective computer system according to the order inherent in the batch file. If a modification needs to be made to the process, the batch file is correspondingly changed by adding to or removing portions from the batch code. That change to the batch file results in a corresponding change to testing parameters (including the sequence in which the tests are run) of each subsequent computer system being manufactured, for each computer system shares the same batch file diagnostic procedure.

While diagnostic arrangements of this kind have exhibited some degree of usefullness in increasing the reliability of computer systems prior to shipment, room for improvement remains. For instance, as testing continues to become more complicated and thorough, batch files and executable files of the diagnostic tests often exceed the storage capabilities of a diskette. Furthermore, it is often difficult or impossible to customize testing and software installation procedures for a single build-to-order computer system or for a certain family of computer systems without modifying the testing for other systems or families. Moreover, it is difficult or impossible to modify the order of software installation or testing for a single build-to-order computer system or for a certain family of computer systems without modifying the order for other systems and families. Finally, the often-complicated nature of current batch file structures sometimes makes it difficult for manufacturers to troubleshoot or maintain testing and software installation procedures quickly and efficiently. Correspondingly, it would be desirable to devise an improved method for installing software and testing computer systems before they are shipped to customers.

SUMMARY

An apparatus for installing software onto a computer system includes a step table and a component table. The step table contains a set of software installation steps shared among different components of substantially all computer systems being manufactured. The component table contains a set of substantially all possible components that are included within computer systems being manufactured. In one embodiment, the computer system corresponds to a family of computer systems and the apparatus further includes a family relation table, a family step relation table and a family component relation table. The family relation table identifies the relationship between a set of software installation steps and each family of computer system being manufactured. The family component relation table identifies the relationship between the family of computer systems and the set of components. The family step relation table identifies the relation between a component and a set of software installation steps appropriate for the corresponding component.

In another embodiment, the invention relates to an apparatus for providing a plurality of steps where a step is associated with a respective component descriptor and includes a respective sequence number. The component descriptor describes a respective component of a computer system. The apparatus includes a step table and a component table. The step table contains a set of software installation steps shared among different components of substantially all computer systems being manufactured. The component table contains a set of substantially all possible components that are included within computer systems being manufactured.

The described apparatus thus provides for effective software installation and computer testing which allows for straightforward troubleshooting and customization of build-to-order computer systems. The modular design of the apparatus advantageously allows for elementary maintenance of a testing system and for the rapid creation of steps for new computer systems and families.

These and other objects, features and advantages of the invention will be further described and more readily apparent from a review of the detailed description of the preferred embodiments which follows.

BRIEF DESCRIPTION OF THE DRAWINGS

FIG. 7 is a flowchart for modifying a system descriptor record and step sequence.

FIG. 8 shows an example of a step file before being executed.

FIG. 9 shows the exemplative step file after being executed.

FIG. 10 is a flowchart of the operation of a program for executing a step sequence.

DETAILED DESCRIPTION

Figure 1:
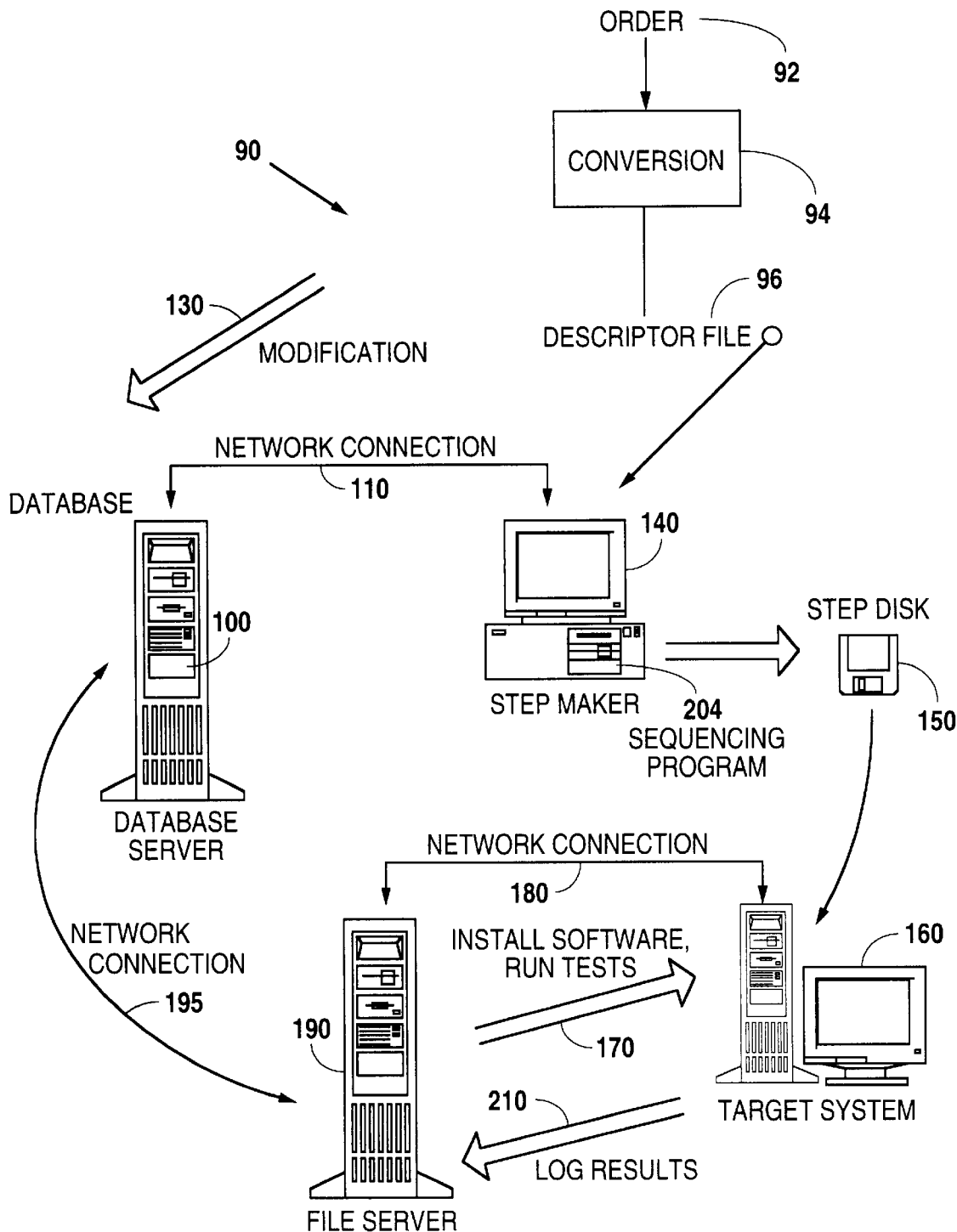
FIG. 1 is a schematic diagram showing software installation and testing.

The following sets forth a detailed description of the best contemplated mode for carrying out the invention. The description is intended to be illustrative and should not be taken to be limiting. In the drawings, like or similar elements may be designated by the same reference numeral. In the description, a module is defined as a command or set of commands.

FIG. 1 is a schematic diagram of software installation and testing system 90. In operation, order 92 is placed to purchase build-to-order target computer system 160. Target system 160 is to be manufactured to contain a plurality of hardware and software components. For instance, target system 160 might include a certain brand of hard drive, a particular type of monitor, a certain brand of processor, and a particular version of an operating system. Before target system 160 is shipped to the customer, the plurality of components are installed and tested. Such software installation and testing advantageously ensures a reliable, working computer system which is ready-to-run upon being received.

Because different families of computer systems and different individual computer components require different software installation and testing steps, it is necessary to determine which tests need be run on target system 160 and in what order those tests should be executed so as to achieve an effective software installation and testing process. Step maker 140 is a computer system configured to sequence the software installation and testing steps to be run on target system 160. To sequence the software installation and/or testing steps, step maker 140, and more particularly, sequencing program 204 residing on step maker 140, first reads a plurality of component descriptors from descriptor file 96. Descriptor file 96 is provided by converting an order 92, which corresponds to a desired computer system having desired components, into a computer readable format via conversion module 94.

Component descriptors are computer readable descriptions of the components of target system 160 which components are defined by the order 92. In the preferred embodiment, the component descriptors are included in a descriptor file called a system descriptor record which is a computer readable file containing a listing of the components, hardware and/or software components, to be installed onto target system 160. Having read the plurality of component descriptors, sequencing program 204 retrieves a plurality of software installation and/or testing steps corresponding to the component descriptors from database 100 over network connection 110. Network connection 110 may be any network connection well-known in the art, such as a local area network, an intranet, or the internet. The information contained in database 100 may be updated through a modification depicted by arrow 130.

Having retrieved the software installation and/or testing steps appropriate for target system 160, sequencing program 204 sequences the steps in a predetermined order according to sequence numbers corresponding to each step. Having sequenced the steps required for target system 160, sequencing program 204 writes a series of output files to step disk 150. In the embodiment set forth in FIG. 1, the output files include text files containing command lines appropriate for executing the appropriate software installation and/or testing steps upon target system 160. The execution is performed in the predetermined order according to the sequence numbers corresponding to each step. Step disk 150 accompanies target system 160 on the factory floor where tests are run directly from step disk 150 or, alternatively, from file server 190, connected to target system 160 via network connection 180. Preferably, network connection 180 is a generic network device plugged into a corresponding network port of the target computer system. Following the execution of the software installation and testing steps, results of the installation and tests are logged back to file server 190 over network connection 180.

Figure 2:
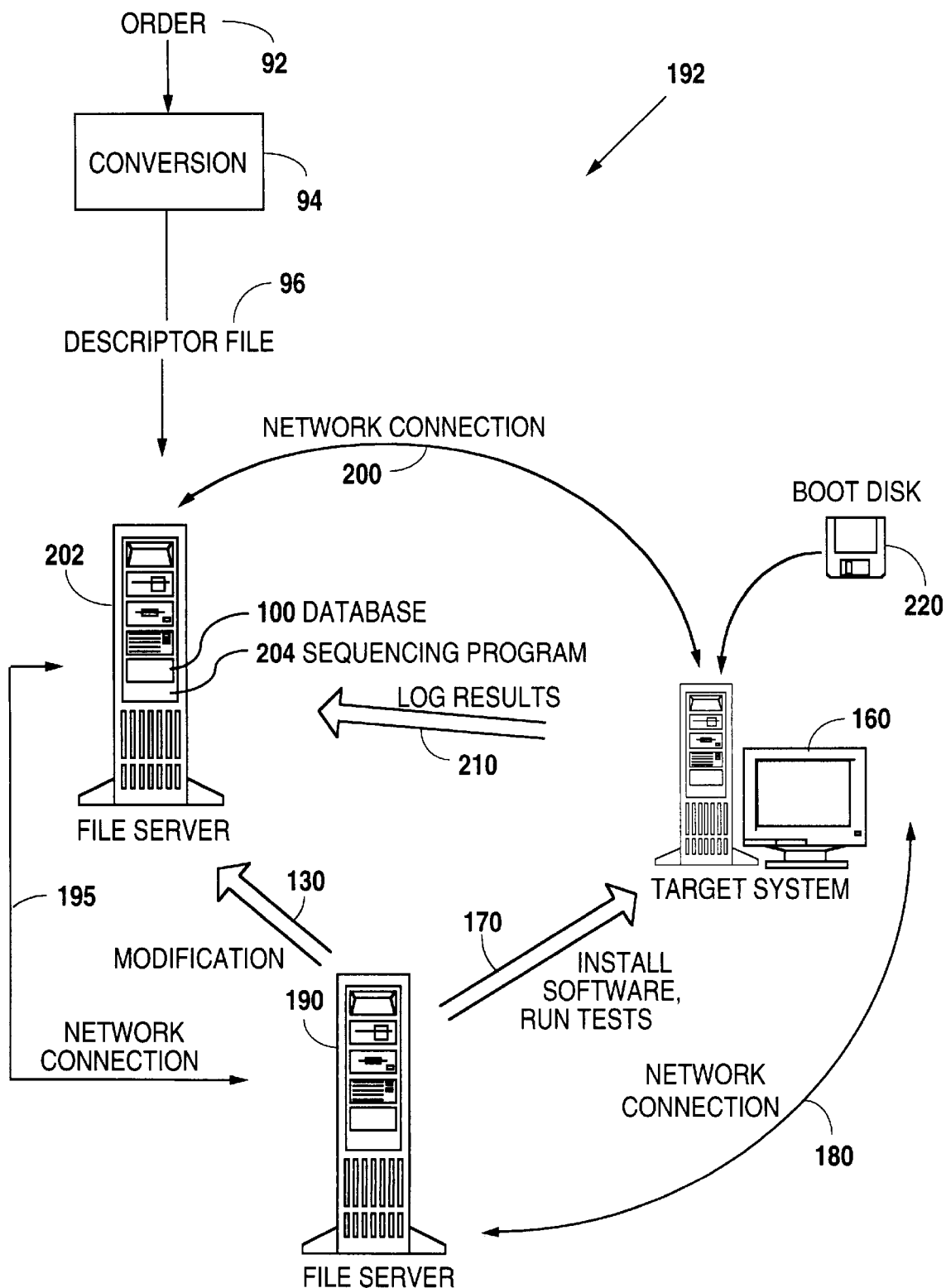
FIG. 2 is a schematic diagram of software installation and testing according to another embodiment.

FIG. 2 is a schematic diagram of software installation and testing system 192 pursuant to another embodiment of the present invention. A customer places order 92 to purchase build-to-order target computer system 160. Target system 160 is to be manufactured to contain a plurality of components which components may include both hardware and/or software components. Before target system 160 is shipped to the customer, the plurality of components are installed and tested. Such installation and testing advantageously ensures a reliable, working computer system which is ready-to-run upon being received by the customer.

To sequence the software installation and testing steps, sequencing program 204 reads a plurality of component descriptors from descriptor file 96. Order 92 is converted into descriptor file 96 via conversion module 94. Component descriptors are computer readable descriptions of the components of target system 160. In the preferred embodiment, the component descriptors are included in a descriptor file called a system descriptor record, a computer readable file containing a listing of each component, both hardware and software, to be installed onto target system 160. The system descriptor record may be stored directly on file server 202. Sequencing program 204 retrieves a plurality of software installation and/or testing steps corresponding to the component descriptors from database 100. Having retrieved the appropriate software installation and/or testing steps for target system 160, sequencing program 204 sequences the steps in a predetermined order according to sequence numbers corresponding to each step. Having sequenced the steps required for target system 160, sequencing program 204 directs the execution of the software installation and testing steps upon target system 160 in the predetermined order via network connections 195 and 180. It is desired that network connection 200 be a generic network device plugged into a corresponding port of target system 160. Network 195 may be any communication connection well-known in the art. Following the execution of the software installation and/or testing steps, results of the installation and tests are logged back to file server 202 over network connection 200 or stored within an appropriate database. As apparent from the illustration, there is no need for separate step maker computer system 140 of FIG. 1. Additionally, step disk 150 is not necessary. Rather, only boot disk 220, which is configured to boot target system 160, is needed to accompany target system 160 on the factory floor.

Having generally described the software installation and testing systems, attention will now be turned to describing the operation of the systems set forth in FIGS. 1 and 2 in more detail.

Figure 3A:
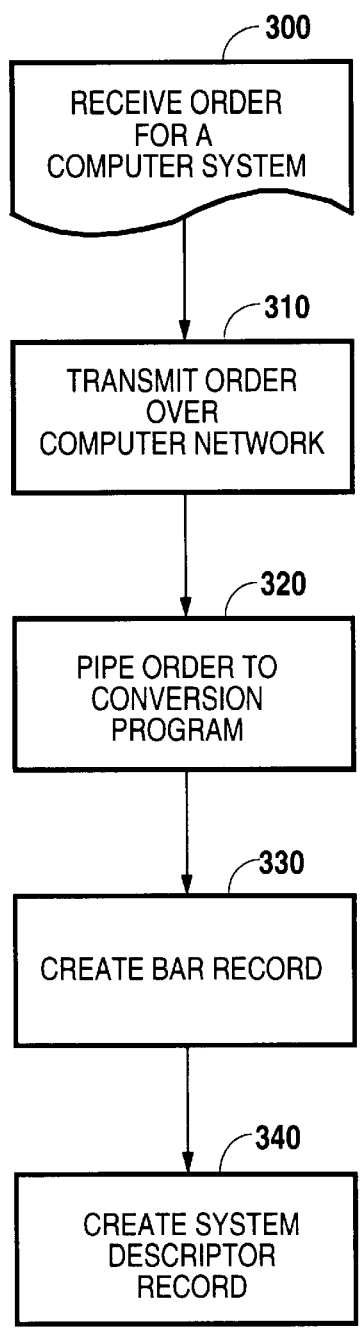
FIG. 3A is a flowchart for converting a computer order into a system descriptor record according to the present invention.

FIG. 3A depicts the preferred process in which an order for a computer system is converted into a computer readable system descriptor record. More specifically, in item 300, an order is received for a target computer system. This order may be in any one of countless forms. For instance, different ordering formats are possible as well as different order delivery mechanisms. For example, orders for a target computer system may be placed by telephone, by mail, or over computer networks (e.g., over the internet). Regardless of the means of taking or the form of the order, the order includes the type of target computer system which a customer desires to purchase and, possibly, an explicit listing of the particular components the customer wishes that target computer system to include. After the order is received, control transitions to transmit module 310 during which the target computer system order is transmitted over a computer network to a manufacturing system (not shown) which produces the target computer system. The target computer system order is also provided to the software installation and testing system where it is piped into a conversion program in module 320. The computer network used in module 310 may be of any type well-known in the art.

The conversion program converts the target computer system order to a record useful for the manufacturing process. More specifically, the conversion program converts the computer order first into a record called a BAR file at module 330. Preferably, the BAR file contains a unique identifier which identifies the specific target computer system being manufactured. The BAR file also contains a detailed listing of components, which may include both hardware and software, to be included with the target system. Further, it is desired that the BAR file contain manufacturer-specific part numbers or other usefull identifiers for each component. Finally, the BAR file may contain customer-specific information such as name, address, and phone number.

Following the creation of the BAR file in module 330, a system descriptor record is created at module 340. A system descriptor record, in the preferred embodiment, is a computer-readable file which is descriptive of the hardware and software components to be included with the target computer system. In a preferred embodiment, the system descriptor record contains a list of components of the target system in a format including hardware tags, software tags, information tags, and comments. A hardware tag identifies to sequencing program 204 that information following the tag relates to a hardware component. Similarly, the software tag identifies information following the tag as being related to a software component. The information tag indicates that general information is to follow. Comments allow for various statements to be included into the system descriptor record which are ignored by sequencing program 204. It is desired that the system descriptor record also be a text file which is human-readable and easy to understand. Such a file advantageously allows for easy troubleshooting and maintenance of the installation and testing process. It will be appreciated that the system descriptor record could be any list of unique identifiers that correspond to a unique set of tokens, for example, in a simple example, the system descriptor record may be a list of part numbers.

Figure 3B:
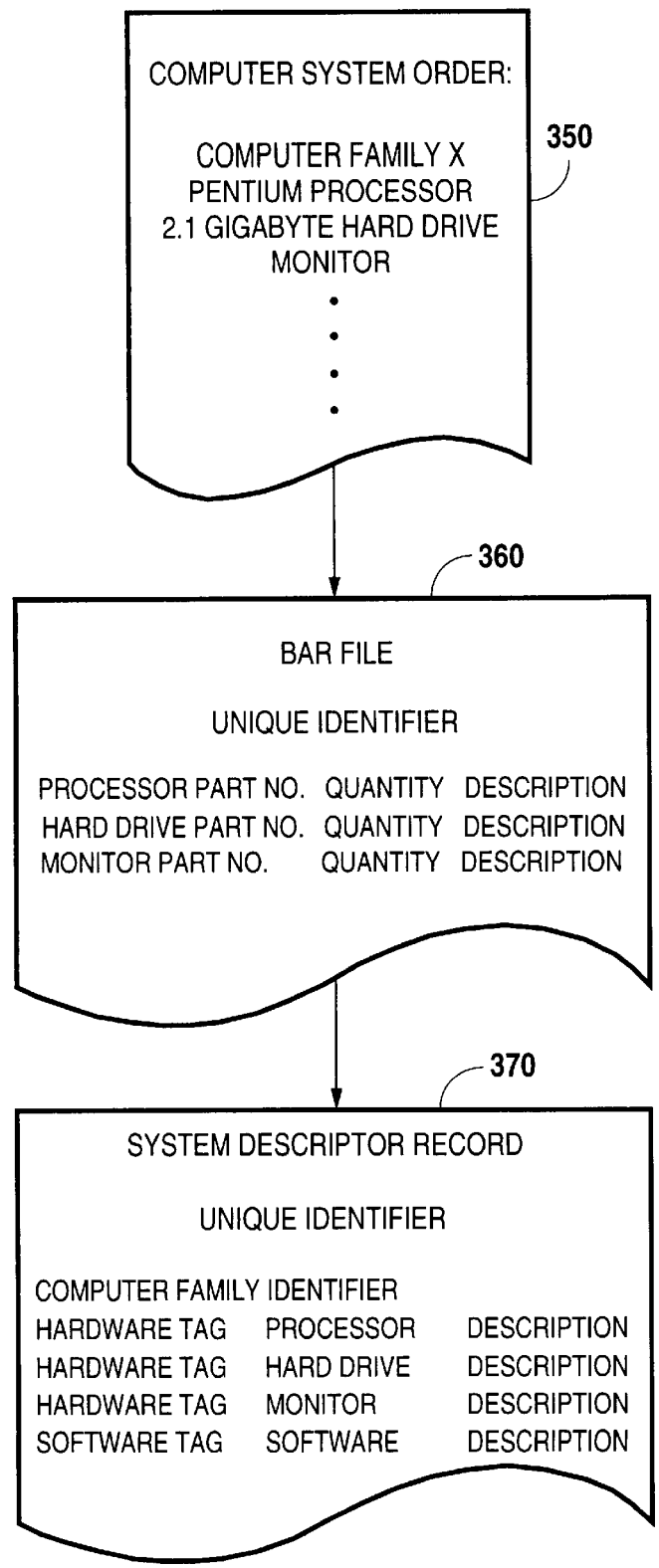
FIG. 3B shows a portion of an example computer order, Base Assembly Record (BAR) file, and system descriptor record.

FIG. 3B shows an example target computer system order 350, a corresponding BAR file 360, and a corresponding system descriptor record 370. Target computer system order 350 contains the name of a computer family, in this illustration, family "X". Also included in target computer system order 350 are three exemplary hardware components including a Pentium® processor, a hard drive, and a monitor. BAR file 360 results from running target computer system order 350 through a conversion program as depicted in module 320 of FIG. 3A. BAR file 360 contains a unique identifier for the specific target computer system within family X. BAR file 360 also includes the manufacturer-specific part numbers for each of the components listed in the target computer system order. Further, BAR file 360 contains an identifier indicating the quantity desired of each component as well as a text description of each component to be included on the target computer system. System 90 uses BAR File 360 to create system descriptor record 370.

As illustrated, the system descriptor record 370 also contains the unique identifier for the specific target computer system within family X. Moreover, the system descriptor record 370 contains appropriate tags, here indicating that the processor, hard drive and monitor are all hardware, rather than software, components. The system descriptor record 370 describes those components in a text description. Additionally, the exemplative system descriptor record 370 contains a software tag indicating that certain software should be installed or tested on the target computer system belonging to family X. For example, the software tag might indicate that a certain operating system appropriate for the Pentium® processor always be installed onto the hard drive of the target computer system belonging to family X.

Figure 4:
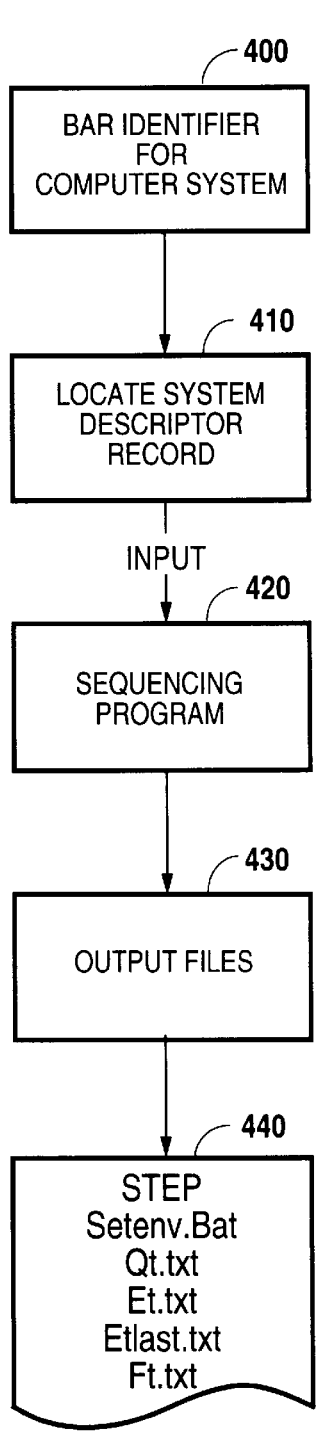
FIG. 4 is a flowchart for creating and providing a step sequence.

In FIG. 4, the preferred general method for sequencing software installation and testing steps is set forth. In module 400, the unique identifier of the target computer system is generated for the target computer system 160. In the embodiment depicted in FIG. 1, a user sitting at step maker computer system 140 provides the unique identifier (e.g., the BAR identifier which functions as a tracking code) into sequencing program 204 of step maker 140. Alternatively, in the embodiment of FIG. 2, the unique identifier is automatically read into sequencing program 204 after the target computer system order is received.

In module 410, a system descriptor record corresponding to the BAR identifier is located. In the embodiment of FIG.

1, either network connection 110 or network connection 195 locates the system descriptor record. In the embodiment of FIG. 2, network connection 195 locates the system descriptor record. In module 420, the located system descriptor record is provided to sequencing program 204. In the FIG. 1 embodiment, the sequencing program resides on step maker computer system 140 while in the FIG. 2 embodiment, the sequencing program resides upon file server 202. Sequencing program 204 works in conjunction with database 100 (of FIGS. 1 and 2) to sequence software installation and testing steps for target computer system 160. Once the software installation and testing steps appropriate for the particular target computer system are sequenced, sequencing program 204 produces output files as depicted in module 430.

In the embodiment depicted in FIG. 1, the output files are preferably written to step disk 150 (see FIG. 1) in six separate files. Those files include (1) a step file, (2) a Setenv.bat file, (3) a Qt.txt file, (4) an Et.txt file, (5) an Etlast.txt, and (6) an Ft.txt file. It is desired that the step file be an ASCII text file including a list of appropriate command lines for executing the software installation and testing steps for the target computer system being ordered. In a preferred embodiment, the step file also includes commands which may be looped. More specifically, the step file allows commands to be repeated for a defined number of iterations or for a defined length of time. Such a format advantageously allows for software installation or testing steps to be repeated in a calculated, predetermined manner. The Setenv.bat file preferably sets environment variables on the target computer system. It will be appreciated that in a mode of operation, only the Step file and the Setenv.bat file are necessary for installation and testing. The Step file and the Setenv.bat file are ASCII text script files containing a list of appropriate command lines for executing the installation and testing steps for the target computer system. The Qt.txt, Et.txt, Etlast.txt, and Ft.txt files are preferably all ASCII text files containing a list of appropriate command lines for executing the software installation and testing steps for the target computer system in the Quick Test (Qt), Extended Test1 (Et), Extended Test2 (Etlast), and Final Test (Ft) phases of manufacture of the target computer system.

In the embodiment of FIG. 2, on the other hand, output files are not written to a step disk as depicted in FIG. 1. Instead, the output files reside upon file server 202 or file server 190, where they are used to direct the execution of the software installation and/or testing steps upon target computer system 160.

Figure 5:
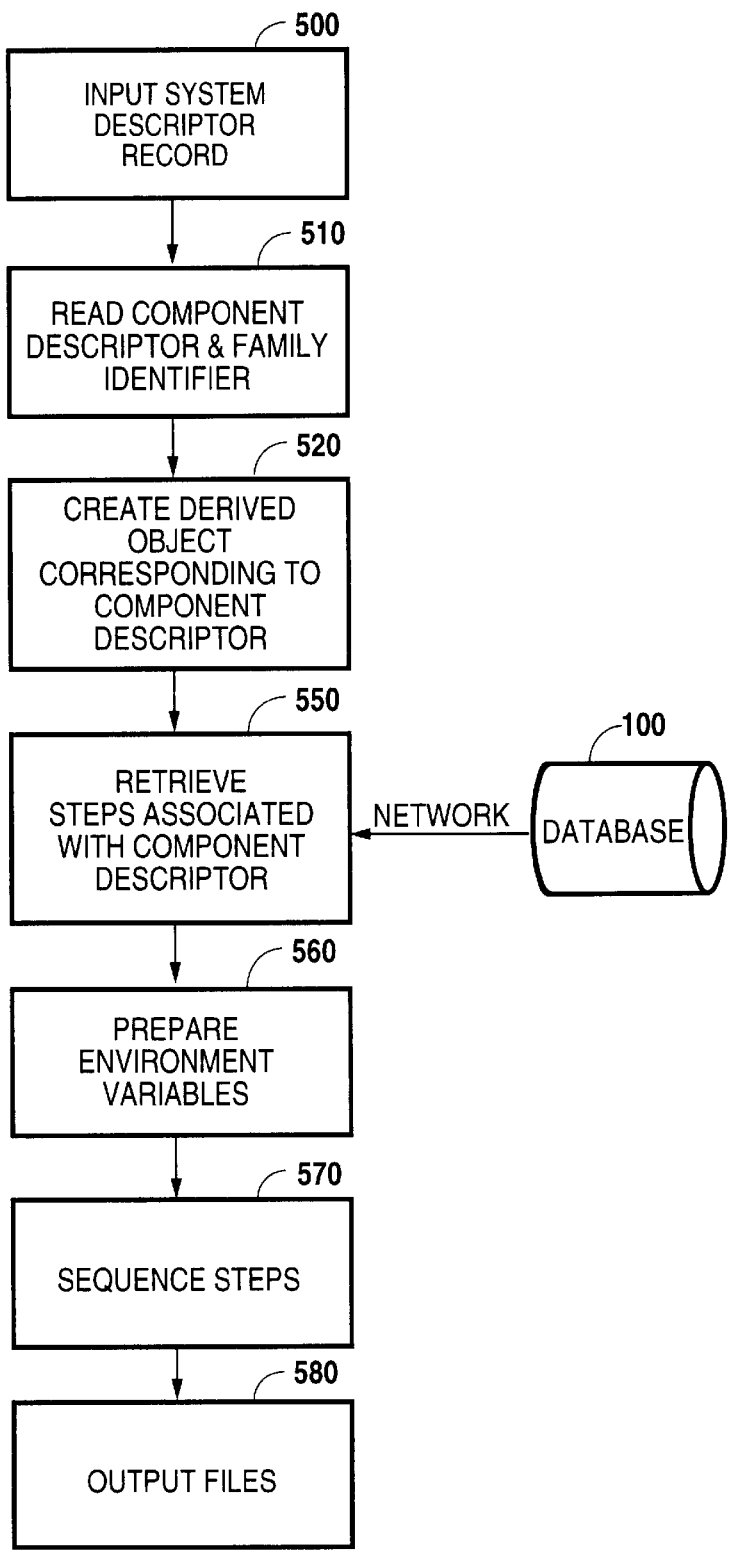
FIG. 5 is a more detailed flowchart for creating a step sequence.

FIG. 5 depicts a more detailed schematic of the operation of sequencing program 204 depicted in FIGS. 1 and 2. In module 500, a system descriptor record corresponding to target computer system 160 is provided to sequencing program 204. In module 510, a component descriptor is read from the system descriptor record. Each component descriptor describes a respective component, hardware or software, of the target computer system.

Turning to FIG. 3B, the line of the system descriptor record including the Pentium® processor in module 370 is an example component descriptor. In module 520, sequencing program 204 initiates a plurality of derived objects corresponding to the plurality of components of target computer system 160. In the preferred embodiment, those derived objects are used to store information (obtained from database 100) about software installation and testing steps that need to be run on target computer system 160. In module 550, software installation and testing steps associated the respective components of target computer system 160 are retrieved from database 100 and stored in the appropriate derived object. In the embodiment of FIG. 1, the steps are retrieved via network connection 110 while in the FIG. 2 embodiment, the steps may be retrieved directly from file server 202. To describe how the steps are retrieved from database 100 in the preferred embodiment requires a description of the preferred construction of that database.

Figure 6:
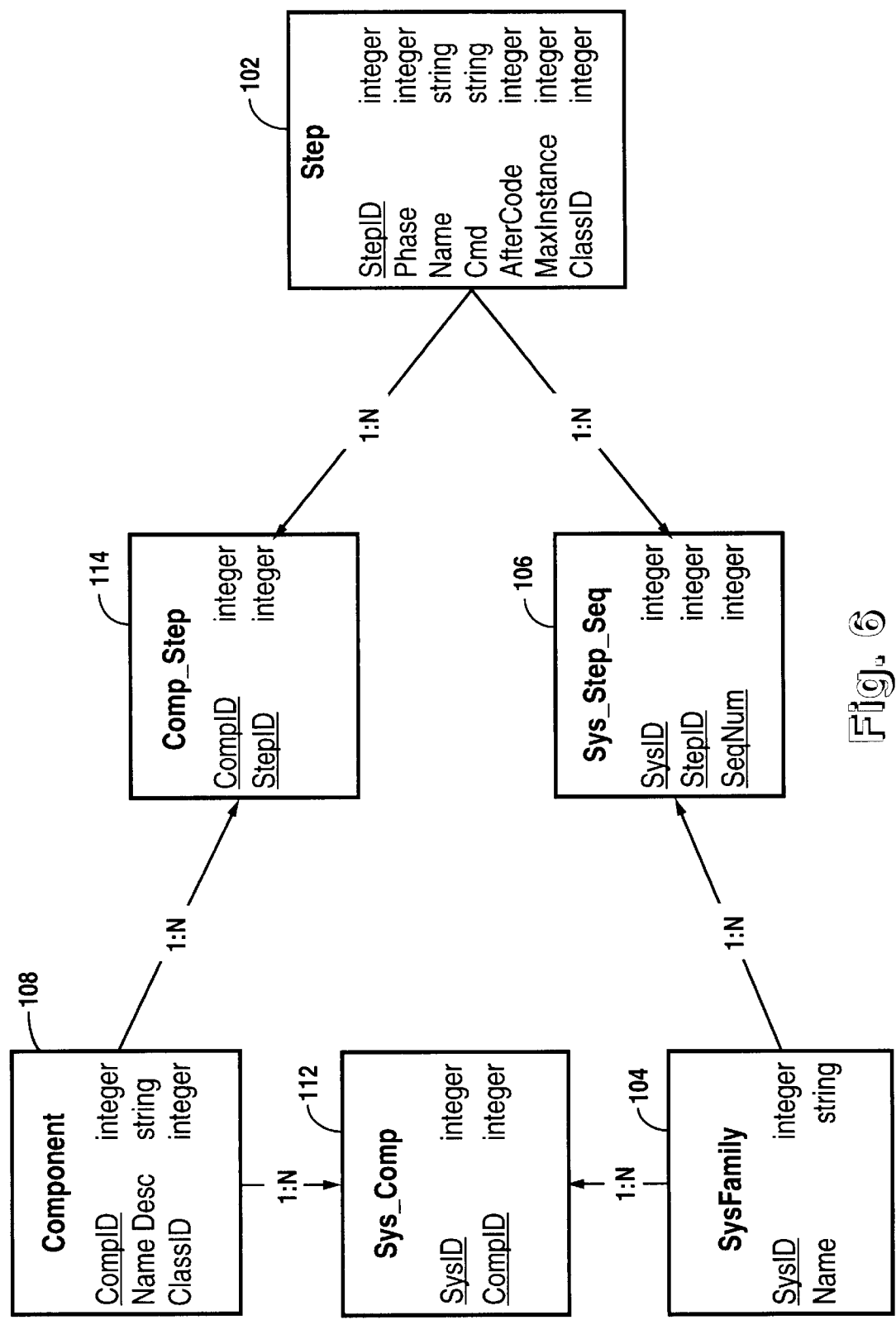
FIG. 6 shows a structure of a database.

FIG. 6 shows the design of database 100. Database 100 associates sequences of software installation and/or testing steps, in a predetermined order, with families of computer systems. Further, database 100 is configured to associate components of computer systems with families of computer systems. Still further, database 100 associates software installation and/or testing steps with components of computer systems.

Database 100 is preferably a relational database. Database 100 contains several tables, each containing attributes suitable for creating the associations mentioned above.

Database 100 contains Step table 102, SysFamily table 104, Sys_Step_Seq table 106, Component table 108, Sys_Comp table 112, and Comp_Step table 114. In the preferred embodiment, each table contains a list of attributes, the underlined attributes serving as a primary key.

Step table 102 contains a set of software installation and testing steps being shared among different components of all computer families. In the preferred construction, Step table 102 has attributes including StepID, Phase, Name, Cmd, CmdType, AfterCode, and Maxinstance. StepID is a unique identification number for each software installation or testing step. Phase designates which phase of manufacture the step is to be executed. For example, Phase is an integer chosen to correspond to four phases of computer system manufacturing consisting of: (1) Quick Test, (2) Extended Test1, (3) Extended Test2, and (4) Final Test. Name is a string assigning a name which is descriptive of the step. Cmd is a string assigning an executable command line for performing the software installation or testing step upon target system 160 (depicted in FIGS. 1 and 2). AfterCode is an identifier which determines if a halt or reboot is needed after the software installation or testing step is executed. MaxInstance is an identifier which indicates the maximum number of allowed times the step may run. Finally, ClassID identifies a certain type of component which is associated with the software installation or testing step.

SysFamily table 104 identifies each family of computer systems with an identification integer specified in attribute SysID. Also included in the SysFamily table is a string identifying the name of the family.

Sys_Step_Seq table 106 is a relational table which contains relations between Step table 102 and SysFamily table 104. Sys_Step_Seq table 106 includes a family identification integer specified in attribute SysID for a particular family of computer systems (from SysFamily table 104), a step identification integer specified in attribute StepID (from Step table 102) identifying a particular set of steps appropriate for that family, and a sequence number. The sequence number is preferably contained within the attribute SeqNum which represents a predetermined order in which steps associated with a particular family are to be run. Test engineers assign the sequence numbers, unique within each phase of manufacture, in an order chosen to be the most effective for a particular target system. It will be appreciated that other ways of assigning sequence numbers may be used.

Component table 108 contains all possible components that are included within computer systems being manufactured. Attributes of this table are preferably CompID which assigns an identifier to each component, NameDesc which assigns a string name to each component, and ClassId which references the type of component (e.g., hard drive, CD-ROM drive).

Sys_Comp table 112 is a relational table containing relations between a family of computer systems and a set of components that can be included in that family. The attributes of Sys_Comp table 112 include a computer family identification integer specified in attribute SysID (from SysFamily table 104) and a component identification integer specified in attribute CompID (from Component table 108).

Comp_Step table 114 is a relational table containing relations between a component and a set of software installation and testing steps appropriate for that component. The attributes of Comp_Step table 114 include a component identification integer specified in attribute CompID (from Component table 108) and a step identification integer specified in attribute StepID (from Step table 102).

The example target computer system depicted in FIG. 3B will be used to illustrate how the above-outline database design is utilized to retrieve software installation and testing steps. The computer family identifier in the system descriptor record identifying family X is associated with the SysID corresponding to family X in SysFamily table 104. Component table 108 is used to check if the components of the target computer system listed in the target computer system order are legal. In other words, the sequencing program and database determine if the processor, hard drive, monitor, and software contained in the system descriptor record of FIG. 3B have corresponding entries and corresponding integers specified by CompID in Component table 108. If a component is not legal (i.e. if a component in the system descriptor record is not contained in Component table 108), an error flag is raised. The Sys_Comp table 112 is a relational table which contains mappings from the Component table 108 and the SysFamily table 104. The Sys_Comp table 112 contains all the legal components which may be included on a target computer system belonging to family X. Thus, the Sys_Comp table 112 may be used to check if all the components of the target system are legal. In other words, the sequencing program and database determine if the processor, hard drive, monitor, and software contained in the system descriptor record of FIG. 3B have corresponding relations in the Sys_Comp table 112. If a component is not legal (i.e. if a component in the system descriptor record may not be included on a target system belonging to family X), an error flag is raised.

In the relational Sys_Step_Seq table 106 resides mappings from Step table 102 and SysFamily table 104. The Sys_Step_Seq table 106 contains all the software installation and testing steps which may legally be run on target computer systems belonging to family X. Furthermore, it is in this Sys_Step_Seq table 106 that sequence and phase numbers are associated with each software installation and testing step. Those sequence and phase numbers represent the proper order in which steps should be run for a particular family of computer systems. Therefore, the Sys_Step_Seq table 106 contains a listing of steps to be run on family X target computer systems as well as sequence and phase numbers representing a predetermined order in which the steps should be executed.

The Comp_Step table 114 is a relational table which contains mappings from the Component table 108 and the Step table 102. The Comp_Step table 114 contains the software installation and testing steps to be run for the processor, hard drive, monitor, and software of the target computer system.

To retrieve software installation and testing steps associated with the respective components to be included on the target system involves performing a join operation on the Sys_Comp table 112 and the Comp_Step table 114 to obtain an intermediate set listing steps to be run on the components of target computer system 160.

The join operation results in a list of steps to be run on the processor, hard drive, monitor, and software listed in the system descriptor record depicted in FIG. 3B. The result of the joinder of the Sys_Comp table 112 and the Comp_Step table 114 is then joined with the Sys_Step_Seq table 106 which contains all the steps for family X. The result of this join operation includes sequencing information in the form of sequence numbers and phase numbers, the sequence numbers being unique within a particular phase. Thus, a three-table join of Sys_Comp table 112, Comp_Step table 114, and Sys_Step_Seq table 106 yields the appropriate software installation and testing steps as well as sequencing information in the form of sequence and phase numbers to install and/or test software upon target computer system 160.

If the result of the first join operation (the join of Sys_Comp table 112 and Comp_Step table 114) is an empty set, an error condition is raised, for an empty set signals that a component to be included on the target system does not belong in the family listed on the system descriptor record. An example of this is illustrative. Consider that a system descriptor record correctly indicates that a target computer system belongs to family Y. Assume, however, that system descriptor record incorrectly indicates that a hard drive (hard drive Z) belonging only to target systems in family X should be included on the target system which is in family Y. In that case, Comp_Step table 114 contains steps associated with hard drive Z. Sys_Comp table 112 contains components associated with family Y. Thus, joining Comp_Step table 114 with Sys_Comp table 112 produces an empty set, for hard drive Z is not a component associated with family Y (instead, it is only associated with family X). As apparent from the above example, the preferred design of the database advantageously allows one to make certain that a target system of a certain family contains only components appropriate for that family.

Referring again to FIG. 5, after the steps associated with the components to be included in the target system are retrieved, sequencing program 204 prepares environment variables for the target computer system in module 560 by reading the system descriptor record and creating a environment file corresponding to the components to be included on the target system. For example, the system descriptor record depicted in FIG. 3B is read, and an environment variable such as "set cpu=pentium" might be prepared corresponding to the processor hardware component of the system descriptor record.

In module 570 of FIG. 5, the plurality of retrieved software installation and testing steps, retrieved by the three-table join described above, are sequenced in the predetermined order. This sequencing is in accordance with the respective sequence numbers and phase numbers to provide a step sequence. The sequencing itself may be accomplished using any one of many sorting algorithms well-known in the art.

In module 580, the sequencing program 204 outputs files. As mentioned earlier, the output files, are preferably written to step disk 150 (see FIG. 1) in six separate files in the embodiment depicted in FIG. 1. Those files include (1) a step file, (2) a Setenv.bat file, (3) a Qt.txt file, (4) an Et.txt file, (5) an Etlast.txt, and (6) an Ft.txt file. It is desired that the step file be an ASCII text file. In a preferred embodiment, the step file also includes commands which may be looped. More specifically, the step file allows commands to be repeated for a defined number of iterations or for a defined length of time. The Setenv.bat file sets the environment variables on the target computer system. The step file contains the steps to be executed respectively during the Quick Test (Qt), Extended Test1 (Et), Extended Test2 (Etlast), and Final Test (Ft) phases of manufacture of the target computer system. In the embodiment of FIG. 2, on the other hand, the output files are not written to a step disk as depicted in FIG. 1. Instead, the output files reside upon file server 202 or file server 190, where they can be used to direct the execution of the software installation and testing steps upon target computer system 160.

Turning again to FIGS. 1 and 2, arrow 130 depicts that modifications may be made to database 100. For instance, if a new family of computer systems is created, one may modify database 100 accordingly. More specifically, the new family is assigned a new family identifier in SysID of SysFamily table 104 and a name for the new family is assigned to the Name attribute of SysFamily table 104. A list of software installation steps and testing steps is added to Sys_Step_Seq table 106, these steps representing which steps need be run, and in what predetermined order, upon the new computer system family. If the new family of computer systems shares several similarities with an existing family, it is likely that entries for the existing family in Sys_Step_Seq table 106 may be modified to produce entries for the new family. If any new steps need be created for the new family of computer systems, these steps are added to Step table 102. Similarly, if any new components accompany the new family of computer systems, those components are added to Component table 108. Comp_Step table 114 is updated to associate each component of the new family of computer systems with the steps appropriate for its software installation and testing. If the new family uses only components already present in the database, this table need not be modified. Sys_Comp table 112 is updated so that a list of allowed components which may be included on the new family would be in the database. Particularly, one would need to associate the SysID of the new computer system with the CompID of each allowed component. Again, this could may be done by copying and then modifying an existing entry of an older family of computer systems.

It shall be appreciated that in constructing a database according to the preferred embodiment, certain significant advantages are provided. In particular, the modular design of the database advantageously allows for easy setup of software installation and testing steps for new families of computer systems. Additionally, software installation and testing steps for a particular family of computer systems or for a particular component may be modified independent of other software installation and testing steps.

FIG. 7 depicts how a system descriptor record and a step sequence may be patched to allow for modular modifications in a software installation and testing process pursuant to the invention. In module 600, a system descriptor record is created. In module 610, the system descriptor record is modified using a system descriptor record patch. In the preferred embodiment, this patch is modular, allowing patches to be created for a specific target computer system, a particular family of computer systems, or for a particular component. For instance, if a manufacturer wished to substitute one brand of hard drives for another for a certain family of computer systems on a certain day, a patch may be formed which would modify all system descriptor records containing the hard drive to be substituted and make the substitution in module 610. In module 620, a step sequence is determined as outlined above. In module 630, the step sequence is modified using a step sequence patch. In the preferred embodiment, this patch is modular, allowing patches to be created for a specific target computer system, a particular family of computer systems or for a particular component. For instance, if a manufacturer wished to run one testing step before another for a certain component on a certain day, a patch may be formed which would modify all step sequences containing the steps whose order is to be modified and correspondingly change the execution order in module 640.

Attention will now be turned on executing the step sequence on target system 160. Software installation and testing steps are executed upon target computer system 160 using a program which reads, interprets, and executes the step sequence corresponding to the target computer system. In the preferred embodiment, this program is called Runstep and is located on step disk 150 in the embodiment of FIG. 1 and on file server 202 in the embodiment of FIG. 2.

FIG. 8 depicts a portion of a step sequence contained in a step file before any software installation and testing steps have been executed. As mentioned earlier, the step sequence includes commands for installing software and/or for testing the build-to-order target computer system. Additionally, the step sequence in the step file allows commands to be repeated for a defined number of iterations or for a defined length of time. Further, the step file may contain remarks, ignored by the Runstep program. In the step file, marks 800 are used to separate fields of the step sequence. Items 810a and 810b are commands for testing target computer system 160. The commands include, for example, a command for testing memory and for testing small computer system interface (SCSI) devices. As can be seen from the figure, each command may include switches such as '-o' appropriate for the particular testing environment. Item 820 is a remark which is ignored by the Runstep program. Item 810c is a command which is looped by time. In the preferred construction, the 'begin_time_loop' instruction designates the starting point of a loop. The 'end_time_loop' instruction designates the ending point of a loop. The 'begin_time_loop' instruction is combined with a field designating the length of time to iterate through the loop. Here, for example, command 810c is run for one hour and thirty minutes. Item 810d is a command which is looped according to number of iterations. In the preferred embodiment, the 'begin_iterate_loop' command instructs the Runstep program that an iterative loop is to be performed. The 'end_iterate_loop' command signals the end of the looping commands. Here, command 810d is run three times.

As the Runstep program executes the step sequence, the Runstep program places timestamp information into the step file, advantageously allowing easy troubleshooting and tracking of the software installation and testing process.

FIG. 9 shows a portion of the step sequence of FIG. 8 after the steps are executed. As illustrated, the Runstep program inserts timestamp information into the step sequence. Item 830 shows when the memory test began, and item 832 shows when that test ended. Item 834 shows when the last iteration of the test began. Items 836 and 838 show when the scsiHD test began and ended, respectively. Item 840 confirms that the iterative loop was performed three times. Finally, items 842 and 844 show when the last iteration of the scsiCD test began and ended, respectively. Inserting timestamp information adjacent to the command which was executed advantageously allows for efficient troubleshooting and tracking of the software installation and testing process.

FIG. 10 shows the preferred general flow of the Runstep program. Runstep program 860 is run in a loop with a Runstep batch file 870. Runstep program 860 reads and interprets a step in a step sequence and writes the command to be run from the step sequence into batch file 870. Batch file 870 is then run, executing the step upon target computer system 160. Upon completion of a step, control is returned from the batch file to Runstep program 860 which then reads and interprets the next line of the step sequence.

Figure 11:
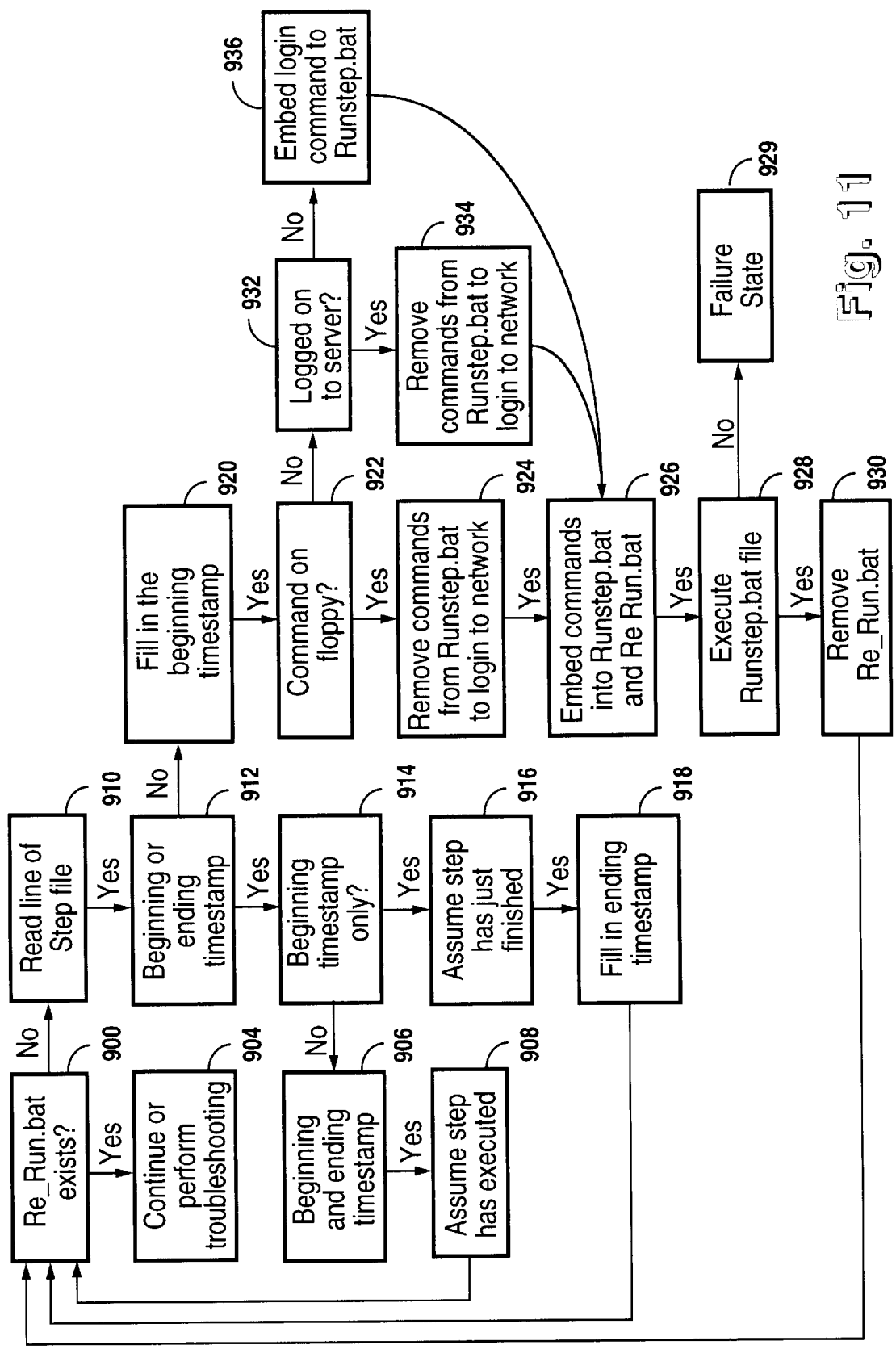
FIG. 11 is a more detailed flowchart of the operation of the program of FIG. 10 for executing a step sequence.

FIG. 11 shows a more detailed flow of the Runstep program. As illustrated in module 900, the Runstep program first checks to see if a file named Re_Run.bat exists. A Re_Run.bat file is created before any command is executed from a step sequence and is removed after successful completion of the command. The existence of Re_Run.bat indicates to the Runstep program in module 900 that the last command run was not successfully completed. Thus Re_Run.bat functions as a start of execution indication. If Re_Run.bat does exist, an operator is asked in module 904 whether or not the software installation and testing process should continue or whether the operator prefers instead to perform troubleshooting. If an operator chooses to continue, then control passes to execute module 928 where the Runstep.bat file is reexecuted. (This condition is the default option if neither option is affirmatively chosen.) If the troubleshooting option is chosen, then troubleshooting is performed as is well known in the art.

If Re_Run.bat does not exist, then the Runstep program determines that the last command was completed correctly, and control is passed to module 910, where a line of the step sequence, preferably contained in a step file, is read. The Runstep program reads the line and determines if there is a beginning or ending timestamp in module 912. If there is a beginning or ending timestamp, then the Runstep program determines, in module 914, whether there is only a beginning timestamp for the line that the Runstep program is reading. If there is only a beginning timestamp, then the Runstep program assumes in module 916 that a software installation or testing step has just been finished and fills in an ending timestamp in module 918. After filling in the ending timestamp, control is returned to module 900.

If there is more than just a beginning timestamp for the line that the Runstep program is reading, the Runstep program determines in module 906 whether there is both a beginning and an ending timestamp. If so, then the Runstep program assumes in module 908 that the step has been executed and control is returned to module 900. If the Runstep program encounters no beginning or ending timestamp in module 912, then the Runstep program fills in the beginning timestamp in module 920 and prepares to run the step on the line of the step sequence that the Runstep program is reading.

In module 922, the Runstep program determines if the command to be run is stored on a local drive (the step file controls which drive in the system is the local drive). The local drive may be, e.g., the step disk, a hard drive of the target system, a RAM drive of the target system, or a network drive. If the command is not located on the local drive, then the Runstep program assumes that the test to be run is contained on a file server somewhere on a network. The Runstep program determines in module 932 whether the Runstep program is already connected to that network. If not, the Runstep program, in module 936, embeds a command into Runstep.bat to login to the network. Therefore a network connection is made before Runstep.bat executes the step on target computer system 160 over network connection 180.

Following module 936, control is passed to module 926. If the Runstep program is already logged into the network the Runstep program, during module 934, removes commands from Runstep.bat to login to the network, for an additional login step is unnecessary if a network connection already exists. Control is then passed to module 926. If the step to be run happens to be on step disk 150, the Runstep program need not log into the network. Thus, in module 924, the Runstep program removes commands from Runstep.bat to login to the network. Control is then passed to module 926. In module 926, the Runstep program embeds the proper command to be run into Runstep.bat and into Re_Run.bat. The command so embedded is taken from the step sequence, preferably contained in the step file. In module 928, the step is executed by running Runstep.bat and, if executed successfully, Re_Run.bat is deleted. If the step is not executed successfully, then the Re_Run.bat file is not deleted and control transfers to failure state 929. Control is then returned to module 900 so that another line may be read from the step sequence. This process continues until all the software installation and testing steps are completed.

Upon execution of the step sequence, the target system is tested and software is installed. In the embodiment of FIG. 1, a select number of tests maybe run directly from step disk 150, but the majority of tests are run from file server 190 over network connection 180. Running tests from file server 190 advantageously eliminates limitations imposed by the storage capacities of floppy disks such as step disk 150.

In the embodiment of FIG. 2, the steps are run from file server 190 over network connection 180. A floppy disk, here boot disk 220, is needed only to boot target computer system 160. Such a system advantageously simplifies the software installation and testing process.

Turning once again to FIGS. 1 and 2, arrow 210 depicts that results from the software installation and testing may be logged back to either file server 190 or to file server 202. The results preferably include whether all the steps were completed successfully and what types of failures (if any) were encountered. Logging the results might include simply saving or writing a modified version of the step file following the execution of the step sequence, for as discussed above, the step file is timestamped by the Runstep program. Such a system advantageously allows for improved troubleshooting capabilities during computer system manufacturing.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A database for use by a system database in the manufacturing of a build-to-order computer system comprising:

a step table containing a set of software installation and testing steps shared among different components of substantially all computer systems being manufactured, wherein a prescribed software installation or testing step is executed by the system database during the manufacturing of the build-to-order computer system to facilitate a corresponding software installation or testing for the build-to-order computer system, the step table including an aftercode attribute identifying whether a halt or reboot is required after a corresponding step is executed; and a component table coupled to the step table, the component table containing a set of substantially all possible components that are included within the computer systems being manufactured, wherein the prescribed software installation or testing step executed by the system database is determined in accordance with a corresponding component included in the build-to-order computer system.

2. The database of claim 1, wherein the step table includes a step identification attribute, the step identification attribute being a unique identification for each software installation or testing step.

3. The database of claim 1, wherein the step table includes a phase attribute, the phase attribute designating in which phase of manufacture a step is to be executed.

4. The database of claim 1, wherein the step table includes a command attribute, the command attribute conforming to an executable command line for performing a software installation step.

5. The database of claim 1, wherein the step table includes a maximum instance attribute, the maximum instance attribute indicating a maximum number of times that a corresponding step runs.

6. The database of claim 1, wherein the step table includes a class identification attribute, the class identification attribute identifying a class of components which is associated with a software installation or testing step.

7. The database of claim 1, wherein the component table includes a component identification attribute, the component identification attribute identifying each component within the component table.

8. The database of claim 1, wherein the component table includes a class identification attribute, the class identification attribute identifying a class of component.

9. The database of claim 1 wherein the computer system corresponds to a family of computer systems; and further comprising:
a family relation table coupled to the step table, the family relation table identifying the relationship between a set of software installation steps and each family of computer system being manufactured;
a family component relation table coupled to the step table, the family component relation table identifying the relationship between the family of computer systems and the set of components; and,
a family step relation table coupled to the step table, the family step relation table identifying the relation between a family of computer systems and a set of software installation steps appropriate for the corresponding component.

10. The database of claim 9, wherein the family relation table includes a family identification attribute identifying a particular family of computer systems.

11. The database of claim 9, wherein the family step relation table includes a step identification attribute identifying a particular set of steps appropriate for a particular family.

12. The database of claim 9, wherein the family relation table includes a sequence number corresponding to each family, the sequence number representing a predetermined order in which steps associated with a family are to be executed.

13. The database of claim 9, wherein the family component relation table defines the relationship between an attribute identifying a computer family and an attribute identifying a component.

14. The database of claim 9, wherein the family component relation table defines the relationship between a component identification attribute and a step identification attribute.

15. The database of claim 9 further comprising:
a family table coupled to the step table, the family table identifying the family of computer systems with a name.

16. A database for use by a system apparatus in the manufacturing of a build-to-order computer system comprising:
a step table containing a set of software installation and testing steps shared among different components of substantially all computer systems being manufactured, wherein a prescribed software installation or testing step is executed by the system apparatus during the manufacturing of the build-to-order computer system to facilitate a corresponding software installation or testing for the build-to-order computer system, the step table including a maximum instance attribute indicting a maximum number of times that a corresponding step runs; and
a component table coupled to the step table, the component table containing a set of substantially all possible components that are included within the computer systems being manufactured, wherein the prescribed software installation or testing step executed by the system database is determined in accordance with a corresponding component included in the build-to-order computer system.

17. The database of claim 16, wherein the computer system corresponds to a family of computer systems and further comprising:
a family relation table coupled to the step table, the family relation table identifying the relationship between a set of software installation steps and a family of computer system being manufactured;
a family component relation table coupled to the step table, the family component relation table identifying the relationship between the family of computer systems and the set of components;
a family step relation table coupled to the step table, the family step relation table identifying the relation between a family of computer systems and a set of software installation steps appropriate for the corresponding component.

18. The database of claim 17, wherein the family relation table includes a family identification attribute identifying a particular family of computer systems.

19. The database of claim 17, wherein the family step relation table includes a step identification attribute identifying a particular set of steps appropriate for a particular family.

20. The database of claim 17, wherein the family relation table includes a sequence number corresponding to each family, the sequence number representing a predetermined order in which steps associated with a family are to be executed.

21. The database of claim 17, wherein the family component relation table defines the relationship between an attribute identifying a computer family and an attribute identifying a component.

22. The database of claim 17, wherein the family component relation table defines the relationship between a component identification attribute and a step identification attribute.

23. The database of claim 16, wherein the step table includes a step identification attribute, the step identification attribute being a unique identification for each software installation or testing step.

24. The database of claim 16, wherein the step table includes a phase attribute, the phase attribute designating in which phase of manufacture a step is to be executed.

25. The database of claim 16, wherein the step table includes a command attribute, the command attribute conforming to an executable command line for performing a software installation step.

26. The database of claim 16, wherein the step table includes an aftercode attribute, the aftercode attribute identifying whether a halt or reboot is required after a corresponding step is executed.

27. The database of claim 16, wherein the step table includes a class identification attribute, the class identification attribute identifying a class of components which is associated with a software installation or testing step.

28. The database of claim 16, wherein the component table includes a component identification attribute, the component identification attribute identifying each component within the component table.

29. The database of claim 16, wherein the component table includes a class identification attribute, the class identification attribute identifying a class of component.

30. A database for use by a system database in the manufacturing of a build-to-order computer system comprising:
   a step table containing a set of software installation and testing steps shared among different components of substantially all computer systems being manufactured, wherein a prescribed software installation or testing step is executed by the system apparatus during the manufacturing of the build-to-order computer system to facilitate a corresponding software installation or testing for the build-to-order computer system, the step table including a phase attribute designating in which phase of manufacture a step is to be extended; and
   a component table coupled to the step table containing a set of substantially all possible components that are included within computer systems being manufactured, wherein the prescribed software installation or testing step executed by the system apparatus is determined in accordance with a corresponding component included in the build-to-order computer system.

31. The database of claim 30, wherein the step table includes a step identification attribute, the step identification attribute being a unique identification for each software installation or testing step.

32. The database of claim 30, wherein the step table includes a command attribute, the command attribute conforming to an executable command line for performing a software installation step.

33. The database of claim 30, wherein the step table includes an aftercode attribute, the aftercode attribute identifying whether a halt or reboot is required after a corresponding step is executed.

34. The database of claim 30, wherein the step table includes a maximum instance attribute, the maximum instance attribute indicating a maximum number of times that a corresponding step runs.

35. The database of claim 30, wherein the step table includes a class identification attribute, the class identification attribute identifying a class of components which is associated with a software installation or testing step.

36. The database of claim 30, wherein the component table includes a component identification attribute, the component identification attribute identifying each component within the component table.

37. The database of claim 30, wherein the component table includes a class identification attribute, the class identification attribute identifying a class of component.

38. The database of claim 30, wherein the computer system corresponds to a family of computer systems; and further comprising:
   a family relation table coupled to the step table, the family relation table identifying the relationship between a set of software installation steps and each family of computer system being manufactured;
   a family component relation table coupled to the step table, the family component relation table identifying the relationship between the family of computer systems and the set of components; and,
   a family step relation table coupled to the step table, the family step relation table identifying the relation between a family of computer systems and a set of software installation steps appropriate for the corresponding component.

39. The database of claim 38, wherein the family relation table includes a family identification attribute identifying a particular family of computer systems.

40. The database of claim 38, wherein the family step relation table includes a step identification attribute identifying a particular set of steps appropriate for a particular family.

41. The database of claim 38, wherein the family relation table includes a sequence number corresponding to each family, the sequence number representing a predetermined order in which steps associated with a family are to be executed.

42. The database of claim 38, wherein the family component relation table defines the relationship between an attribute identifying a computer family and an attribute identifying a component.

43. The database of claim 38, wherein the family component relation table defines the relationship between a component identification attribute and a step identification attribute.

44. The database of claim 38 further comprising:
   a family table coupled to the step table, the family table identifying the family of computer systems with a name.

45. A database for use by a system apparatus in the manufacturing of a build-to-order computer system, the database comprising:
   a step table containing a set of software installation and testing steps shared among different components of substantially all computer systems being manufactured, wherein a prescribed software installation or testing step is executed by the system apparatus during the manufacturing of the build-to-order computer system to facilitate a corresponding software installation or testing for the build-to-order computer system;
   a component table coupled to the step table, the component table containing a set of substantially all possible components that are included within computer systems being manufactured, wherein the prescribed software installation or testing step executed by the system apparatus is determined in accordance with a corresponding component included in the build-to-order computer system;
   a family relation table coupled to the step table, the family relation table identifying the relationship between a set of software installation steps and each family of computer systems being manufactured;
   a family component relation table coupled to the step table, the family component relation table identifying the relationship between the family of computer systems and the set of components; and a family step relation table coupled to the step table, the family step relation table identifying the relation between a family of computer systems and a set of software installation steps appropriate for the corresponding component.

46. The database of claim 45, wherein the family relation table includes a family identification attribute identifying a particular family of computer systems.

47. The database of claim 45, wherein the family step relation table includes a step identification attribute identifying a particular set of steps appropriate for a particular family.

48. The database of claim 45, wherein the family relation table includes a sequence number corresponding to each family, the sequence number representing a predetermined order in which steps associated with a family are to be expected.

49. The database of claim 45, wherein the family component relation table defines the relationship between an attribute identifying a computer family and an attribute identifying a component.

50. The database of claim 45, wherein the family component relation table defines the relationship between a component identification attribute and a step identification attribute.

51. The database of claim 45, further comprising:
a family table coupled to the step table, the family table identifying the family of computer systems with a name.

52. A system database including a database for use in the manufacturing of a build-to-order computer system comprising:
a step table containing a set of software installation and testing steps shared among different components of substantially all computer systems being manufactured by the system apparatus, wherein a prescribed software installation or testing step is executed by the system apparatus during the manufacturing of the build-to-order computer system to facilitate a corresponding software installation or testing for the build-to-order computer system, the step table including an aftercode attribute identifying whether a halt or reboot is required after a corresponding step is executed; and a component table coupled to the step table, the component table containing a set of substantially all possible components that are included within the computer systems being manufactured, wherein the prescribed software installation or testing step executed by the system apparatus is determined in accordance with a corresponding component included in the build-to-order computer system.

53. A system apparatus including a database for use in the manufacturing of a build-to-order computer system comprising:
a step table containing a set of software installation and testing steps shared among different components of substantially all computer systems being manufactured by the system apparatus, wherein a prescribed software installation or testing step is executed by the system apparatus during the manufacturing of the build-to-order computer system to facilitate a corresponding software installation or testing for the build-to-order computer system, the step table including a maximum instance attribute indicting a maximum number of times that a corresponding step runs; and a component table coupled to the step table, the component table containing a set of substantially all possible components that are included within the computer systems being manufactured, wherein the prescribed software installation or testing step executed by the system apparatus is determined in accordance with a corresponding component included in the build-to-order computer system.

54. A system apparatus including a database for use in the manufacturing of a build-to-order computer system comprising:
a step table containing a set of software installation and testing steps shared among different components of substantially all computer systems being manufactured by the system apparatus, wherein a prescribed software installation or testing step is executed by the system apparatus during the manufacturing of the build-to-order computer system to facilitate a corresponding software installation or testing for the build-to-order computer system, the step table including a phase attribute designating in which phase of manufacture a step is to be extended; and a component table coupled to the step table containing a set of substantially all possible components that are included within computer systems being manufactured, wherein the prescribed software installation or testing step executed by the system apparatus is determined in accordance with a corresponding component included in the build-to-order computer system.

55. A system apparatus including a database for use in the manufacturing of a build-to-order computer system comprising:
a step table containing a set of software installation and testing steps shared among different components of substantially all computer systems being manufactured by the system apparatus, wherein a prescribed software installation or testing step is executed by the system apparatus during the manufacturing of the build-to-order computer system to facilitate a corresponding software installation or testing for the build-to-order computer system;

a component table coupled to the step table, the component table containing a set of substantially all possible components that are included within computer systems being manufactured, wherein the prescribed software installation or testing step executed by the system apparatus is determined in accordance with a corresponding component included in the build-to-order computer system;

a family relation table coupled to the step table, the family relation table identifying the relationship between a set of software installation steps and each family of computer systems being manufactured;

a family component relation table coupled to the component table, the family component relation table identifying the relationship between a family of computer systems and a set of components; and a component step relation table coupled to the step table and the component table, the component step relation table identifying the relationship between a set of software installation and testing steps and a set of components.

* * * * *